(12) United States Patent
Masegi

(10) Patent No.: US 6,868,950 B2
(45) Date of Patent: Mar. 22, 2005

(54) SPLINED ANNULAR MEMBER AND AUTOMATIC TRANSMISSION

(75) Inventor: Kenji Masegi, Anjo (JP)

(73) Assignee: Aisin AW Co., Ltd. (JP)

( * ) Notice: Subject to any disclaimer, the term of this patent is extended or adjusted under 35 U.S.C. 154(b) by 82 days.

(21) Appl. No.: 10/164,710

(22) Filed: Jun. 10, 2002

(65) Prior Publication Data

US 2003/0006118 A1 Jan. 9, 2003

(30) Foreign Application Priority Data

Jun. 14, 2001 (JP) ........................................ 2001-180579
Jun. 14, 2001 (JP) ........................................ 2001-180580

(51) Int. Cl.[7] ........................... F16H 55/17; F16D 13/62
(52) U.S. Cl. ......................................... 192/70.2; 74/434
(58) Field of Search ............................ 192/70.2, 70.19, 192/109 R, 112, 115; 74/449, 434; 72/332, 85, 102, 110

(56) References Cited

U.S. PATENT DOCUMENTS

| | | | | |
|---|---|---|---|---|
| 4,014,619 A | * | 3/1977 | Good et al. ................. | 192/70.2 |
| 4,566,571 A | * | 1/1986 | Fujioka ..................... | 192/70.2 |
| 4,705,150 A | * | 11/1987 | Hill ........................... | 192/70.2 |
| 4,813,522 A | * | 3/1989 | Fujioka et al. ............. | 192/70.2 |
| 4,945,782 A | * | 8/1990 | Farrell ....................... | 192/70.2 |
| 5,069,575 A | * | 12/1991 | Anderson .................... | 441/6 |
| 5,180,043 A | * | 1/1993 | Walker ...................... | 192/70.2 |
| 5,881,856 A | * | 3/1999 | Prater ........................ | 192/70.2 |
| 5,896,970 A | * | 4/1999 | Prater ........................ | 192/70.2 |
| 6,095,006 A | * | 8/2000 | Morita et al. ................ | 74/434 |
| 6,530,253 B1 | * | 3/2003 | Gotou et al. .................. | 72/85 |

* cited by examiner

Primary Examiner—Rodney H Bonck
(74) Attorney, Agent, or Firm—Lorusso, Loud & Kelly

(57) ABSTRACT

A splined annular member has spline teeth formed in its cylindrical wall. The teeth are formed as an arrangement of alternating ridges which protrude inwardly and troughs formed between the ridges. Each ridge has a transverse (circumferential) groove that extends outwardly. The groove is defined by two side walls that face each other and a bottom portion extending between the side walls. The side walls are substantially parallel to each other, and at least one of the junctions between the bottom portion and the side walls is formed by half blanking. The spline grooves increase the overall rigidity of the annular member without increase in weight or size. Thus, the present invention provides a light-weight and small-size splined annular member having high rigidity and an automatic transmission incorporating the splined annular member.

24 Claims, 11 Drawing Sheets

SPLINED ANNULAR MEMBER AND AUTOMATIC TRANSMISSION

INCORPORATION BY REFERENCE

The disclosures of Japanese Patent Applications Nos. 2001-180579 and 2001-180580 filed on Jun. 14, 2001, including their specifications, drawings, claims and abstracts, are incorporated herein by reference in its entirety.

BACKGROUND OF THE INVENTION

1. Field of the Invention

The invention relates to a splined annular member for use as a component in various types of machines.

2. Description of the Related Art

Machines, such as vehicular automatic transmissions and the like, incorporate many annular members having a splined annular inner peripheral surface, the splined surface having an arrangement of alternating inwardly protruded ridges and troughs formed between the ridges. Since these splined annular members are used as rotating members, it is desirable that the splined annular members retain high rigidity even during high-speed rotation.

With conventional splined annular members, it is a common practice to increase the plate thickness of the spline or the like, in order to improve rigidity of the member. However, this conventional strategy for improving rigidity of an annular member, by increasing the wall thickness, also increases the weight and size of the member, and therefore cannot meet demand for weight and size reductions.

Japanese Patent Application Laid-Open No. SHO 63-52257 describes a splined annular member for use as a clutch drum. This patent application discloses a splined annular member as shown in FIG. 6 in which a side wall 21 is deformed into a step ("overhang") without breakage to form surface 931. Another wall 932 of the snap ring groove is formed by half blanking. This improves rigidity, as compared with a design in which the two walls of a snap ring groove are formed with a breakage. However, the stepped wall increases the total width of the snap ring groove, and therefore reduces the effective area of the splines. Furthermore, in a clutch drum, the design of FIG. 6 does not provide adequately stable retention of the snap ring.

SUMMARY OF THE INVENTION

Accordingly, it is an object of the invention to provide a light-weight and compact splined annular member with high rigidity, without increasing the weight and size of the member, and to provide a clutch incorporating the splined annular member and an automatic transmission incorporating such a clutch.

Accordingly, the present invention provides a splined annual member including a cylindrical side wall and splines formed on the cylindrical side wall as an arrangement of alternating ridges, which protrude radially inward, and troughs formed between the ridges. A circumferentially extending groove is formed in each ridge for receipt of a snap ring. The groove is defined by two side walls that face each other and by a bottom wall portion which connects with both of the side walls at junctions therebetween. The sidewalls are substantially parallel. At least one junction between the bottom portion and one the side walls is formed by half blanking.

Optionally, one of the junctions between the bottom wall and one of the side walls is cut, e.g. by blanking.

In one embodiment, the grooves are formed in a portion of the splines adjacent an opening at one axial end of the annular member. Optionally, a second groove can be formed in the splines at substantially the middle of their axial length.

In another aspect, the present invention provides a clutch in which the above described annular member serves as the clutch drum and/or the clutch hub. In yet another aspect the present invention provides an automatic transmission incorporating such a clutch.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

First Embodiment

A splined annular member in accordance with a first preferred embodiment of the invention will be described with reference to FIGS. 1 to 5.

Figure 1:
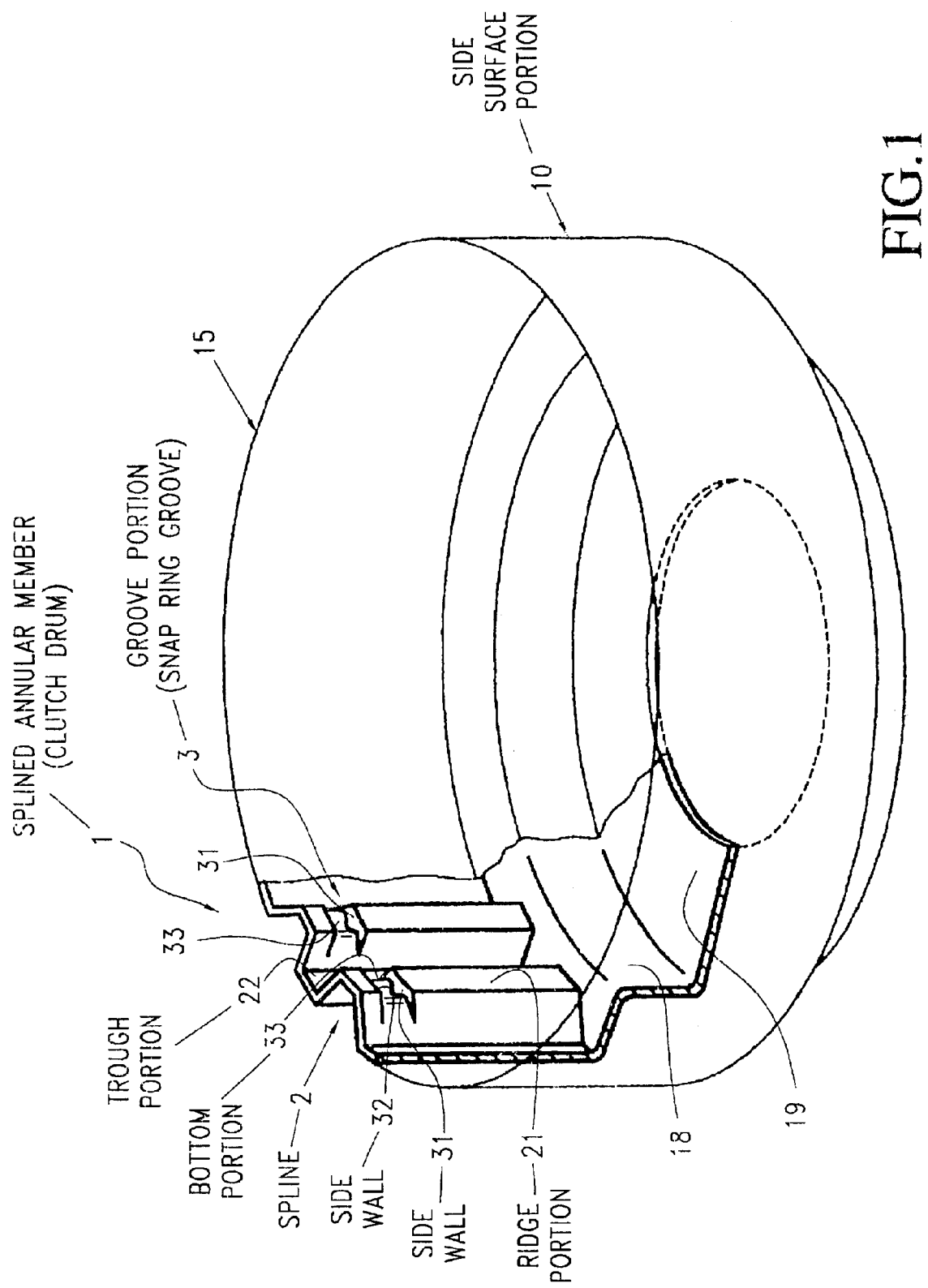
FIG. 1 is a partially cut-away perspective view showing a configuration of a clutch drum in accordance with a first embodiment of the present invention.

Referring to FIG. 1, an annular member 1 has, on the inner surface 10 of its cylindrical side wall, spline teeth 2 that are formed as alternate inwardly protruding ridges 21 and troughs 22 formed between the ridge 21.

Figure 5:
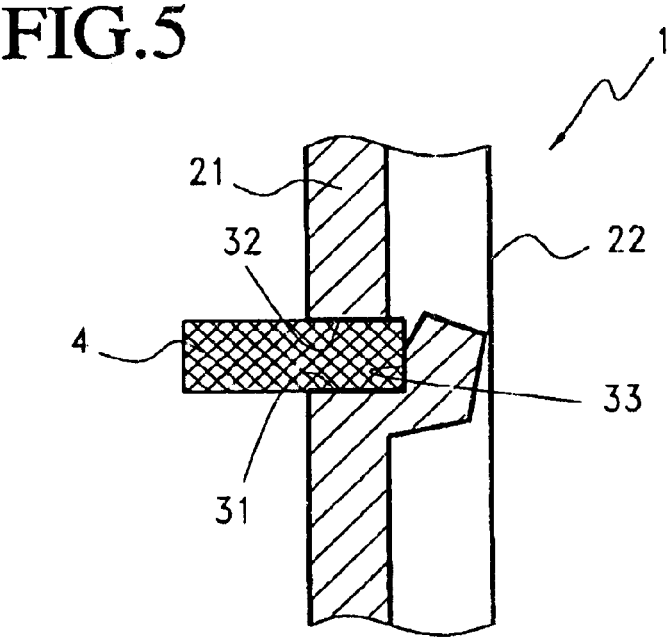
FIG. 5 shows, in cross-section, a snap ring inserted into the snap ring groove in Embodiment 1.

Each ridge 21 has a groove 3 that is an outwardly and circumferentially extending indentation. As shown in FIGS. 1 and 5, the groove 3 of each ridge 21 is defined by two side walls 31, 32 facing each other, and a bottom portion 33 extending between the side walls 31, 32. The two side walls 31, 32 extend substantially in parallel with each other. One of the junctions between the side walls 31, 32 and the bottom portion 33 is formed by half blanking, as will be described later in detail.

The annular member 1 of this embodiment is a clutch drum for use in an automatic transmission. As shown in FIG. 5, the groove 3 is a snap ring groove into which a snap ring 4 is inserted.

The clutch drum 1 has, as shown in FIG. 1, a circular disc-shaped bottom, annular plate portion 19 having a central through-hole, a plain portion 18 extending approximately perpendicular from the bottom plate portion 19 and having a generally circular sectional shape, and a cylindrical side wall 10 having the spline teeth 2.

The junction between the bottom portion 33 and the side wall 31 in the snap ring groove 3 is formed by a half blanking process, and the junction between the bottom portion 33 and the side wall 32 is cut or broken by a blanking process.

In this embodiment, the snap ring groove 3 in the side wall 10 of the clutch drum 1 is formed at a position near opening 15.

In the process for production of the clutch drum 1, a steel plate is press-formed into a cylindrical shape and the spline teeth 2 are formed. Then, the snap ring groove 3 is formed by pressing.

Figure 3:
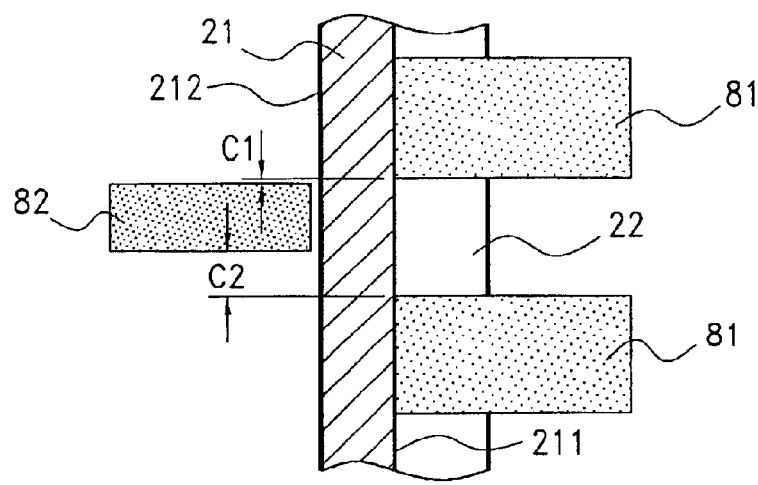
FIGS. 3 and 4 illustrate a process of forming the snap ring groove of the first embodiment.

In this embodiment, the snap ring groove 3 in each ridge portion 21 is formed as shown in FIG. 3 by using dies 81 that contact an outer peripheral surface 211 of the ridge portion 21, and a punch 82 that contacts an inner peripheral surface 212 of the ridge portion 21.

In this embodiment, the two dies 81 have different clearances from the punch 82. More specifically, as shown in FIG. 3, a clearance C1 between the punch 82 and upper die 81 (the die disposed closest to the opening 15) is relatively small, as is generally suitable for a blanking process. On the other hand, the clearance C2 between the lower die 81 and the punch 82 is relatively larger but less than the thickness of the ridge 21 and is sufficiently greater than the clearance set for a cutting process so as to enable half blanking.

Figure 4:
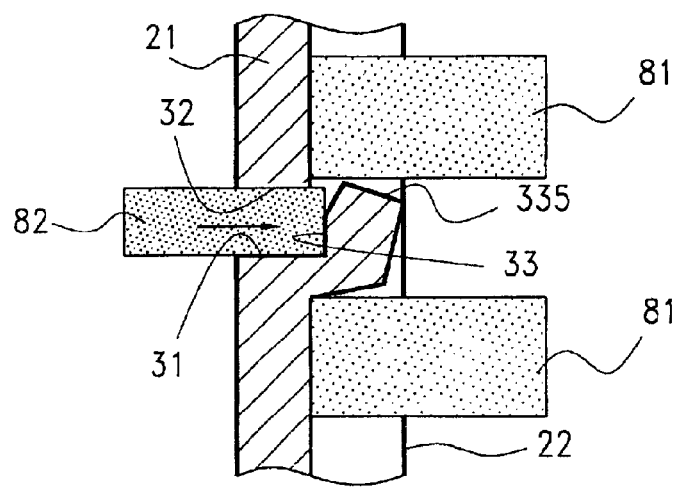

Then, when the punch 82 is advanced to the position in FIG. 4, the portion at the reduced clearance C1 is cut by the punch 82 and the die 81. On the other hand, the lower portion in FIG. 4 with the larger clearance C2 is not cut but, rather, is half-blanked.

Figure 2:
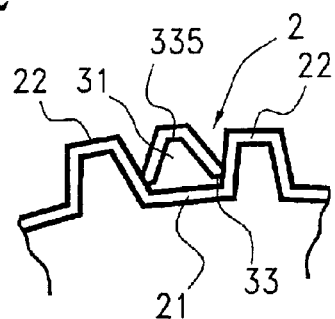
FIG. 2 is an illustration of a spline of the clutch drum of Embodiment 1 viewed from its open side.

As a result, the side walls 31, 32 of the snap ring groove 3 are formed along the punch 82 in parallel to each other. The junction between the side wall 31 and the bottom portion 33 remains continuous in a half-blanked state (uncut) as shown in FIGS. 4 and 5. The junction between the side wall 32 and the bottom portion 33, on the other hand, is cut by blanking, and protrudes toward the adjacent trough as shown in FIGS. 2, 4 and 5.

This forming is performed on all the ridges 21 to form a series of snap ring grooves 3 that together form a single snap ring groove extending circumferentially.

Thus, as described above, each ridge 21 of the spline teeth 2 is provided with a snap ring groove 3. Since the two side walls 31, 32 of the snap ring groove 3 of each ridge 21 extend substantially in parallel, the width of the groove portion 3 can be made relatively smaller. Thus, the length of each ridge 21 which is sacrificed can be reduced.

Furthermore, since the two side walls 31, 32 are substantially parallel as shown in FIG. 5, the snap ring 4 inserted in the snap ring groove 3 is retained so as to face the two side walls 31, 32 and to prevent the snap ring 4 from shifting and/or tilting.

The junction between the bottom portion 33 and the side wall 31 of the snap ring groove 3 is formed by half blanking and, therefore, the side wall 31 and the bottom portion 33 are connected by the half-blanked portion. The presence of the snap ring groove 3 substantially increases the rigidity of the spline teeth 2. Consequently, the tendency of the spline teeth 2 to deform outwardly due to centrifugal force, when the clutch drum 1 is rotated, can be reduced.

In the clutch drum 1 of this embodiment, the snap ring groove 3 is formed at a position in the side surface 10 near the opening 15 and, therefore, the snap ring groove 3 efficiently increases the rigidity of that portion of the side surface 10 adjacent to the opening 15 which is most likely to deform when the clutch drum 1 rotates. Thus, the deformation reducing effect can be further enhanced.

Therefore, in the present invention, there is no need for measures such as, for example, increasing the wall thickness of the spline teeth 2 which results in increased weight. Hence, the present invention provides a lightweight, compact-size and high-rigidity clutch drum 1 having spline teeth 2.

COMPARATIVE EXAMPLE 1

Figure 6:
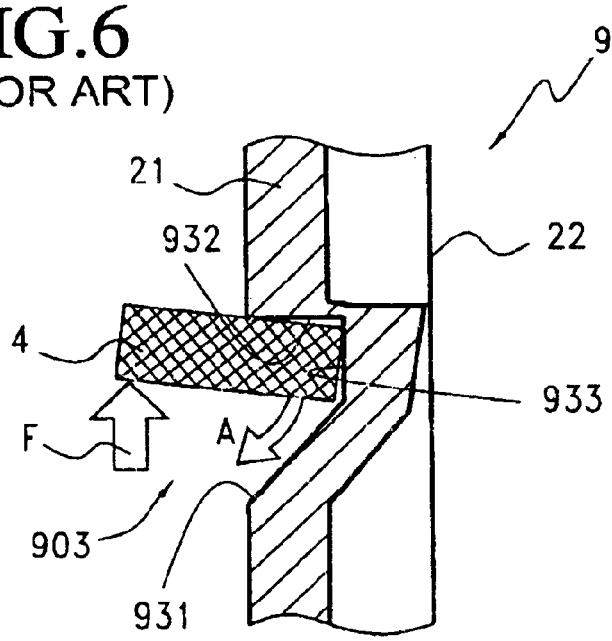
FIG. 6 shows, in cross-section, a snap ring inserted into a snap ring groove in one example of the prior art.

FIG. 6 shows, as Comparative Example 1, an annular member 9 having a snap ring groove 93 as disclosed in Japanese Patent Application Laid-Open No. SHO 63-52257.

In Comparative Example 1, a junction between a bottom portion 933 and a side wall 932 of the snap ring groove 93 is formed by half blanking as in Embodiment 1, and a junction between the bottom portion 933 and another side wall 931 is formed by buckling.

As can be seen in a comparison FIGS. 5 and 6, Comparative Example 1 has a snap ring groove of a much greater width than Embodiment 1, and therefore Comparative Example 1 sacrifices a greater effective length of the ridge 21. Therefore, it is rather difficult to take full advantage of the ridges 21.

Furthermore, it can be understood that snap ring groove of Embodiment 1 far more stably retains the snap ring 4 than snap ring groove of Comparative Example 1. That is, as shown in FIG. 6, the snap ring 4 relatively easily shifts and tilts as indicated by arrow A if a force F is applied to a radially inner portion of the snap ring 4. If the stress F is great, the snap ring 4 may be broken.

In contrast, in Embodiment 1, the two side walls 31, 32 of the snap ring groove 3 are substantially parallel as shown in FIG. 5, and therefore the snap ring 4 faces the two side wall surfaces when fitted into the snap ring groove 3. Therefore, even if the snap ring 4 is stressed, the two side walls 31, 32 support the snap ring 4 so as to reduce the shifting or tilting of the snap ring 4 and therefore prevent the snap ring 4 from being broken.

Second Embodiment

Figure 7:
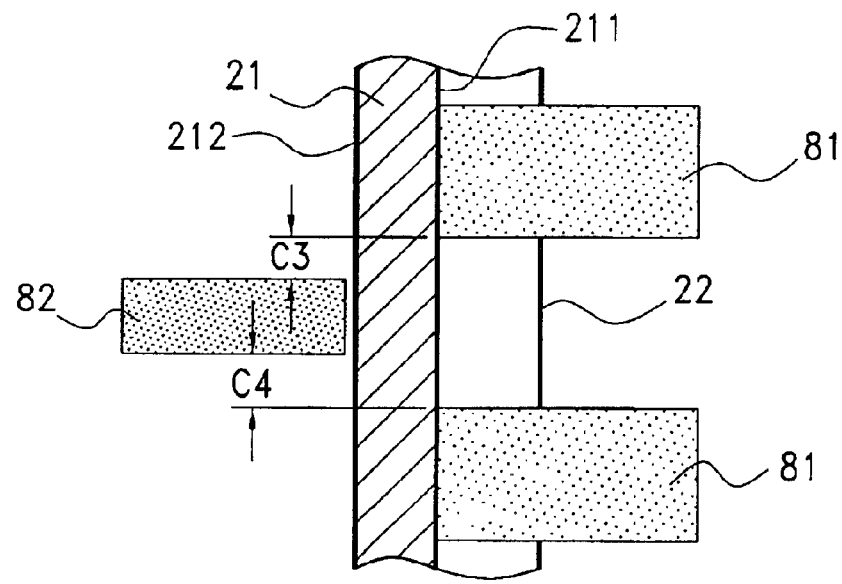
FIG. 7 illustrate formation of a snap ring groove in accordance with a second embodiment of the present invention.
Figure 8:
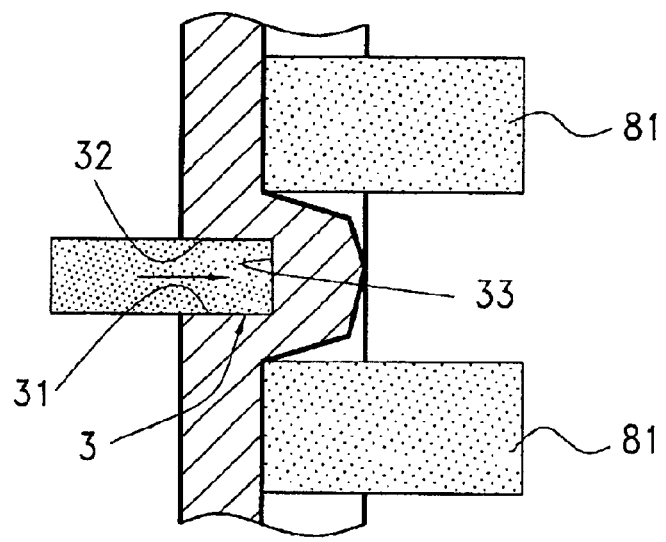
FIG. 8 shows, in cross-section, a snap ring inserted into the snap ring groove of the second embodiment of the present invention, formed as shown in FIG. 7.

A second embodiment of the present invention adopts a snap ring groove as shown in FIGS. 7 and 8 instead of the snap ring groove 3 of Embodiment 1. In the snap ring groove of Embodiment 2, junctions between a bottom portion 33 and two side walls 31, 32 are both formed by half blanking.

The snap ring groove 3 of a clutch drum 1 of this second embodiment is formed as in Embodiment 1, that is, by using dies 81 that contact an outer peripheral surface 211 of the ridge portion 21, and a punch 82 that contacts an inner peripheral surface 212 of the ridge portion 21 as shown in FIG. 7.

In this second embodiment, the clearances between the dies 81 and the punch 82 are different from those in Embodiment 1. That is, as shown in FIG. 3, the clearances C3, C4 between the punch 82 and the upper and lower dies 81 are less than the thickness of the ridge portion 21 and are sufficiently greater than the clearance set for a cutting process, so that half blanking is effected.

Therefore, when the punch 82 is advanced as shown in FIG. 8, cutting does not occur but, rather, the half blanking results because the clearances C3, C4 are both relatively large. As a result, junctions between the bottom portion 33 and the two side walls 31, 32 of the snap ring groove 3 in this embodiment remain connected in a half-blanked state. Therefore, the rigidity of the spline teeth 2 is increased to a greater extent in Embodiment 2 than in Embodiment 1.

In other respects, Embodiment 2 achieves substantially the same advantages as those of Embodiment 1.

Third Embodiment

Figure 9:
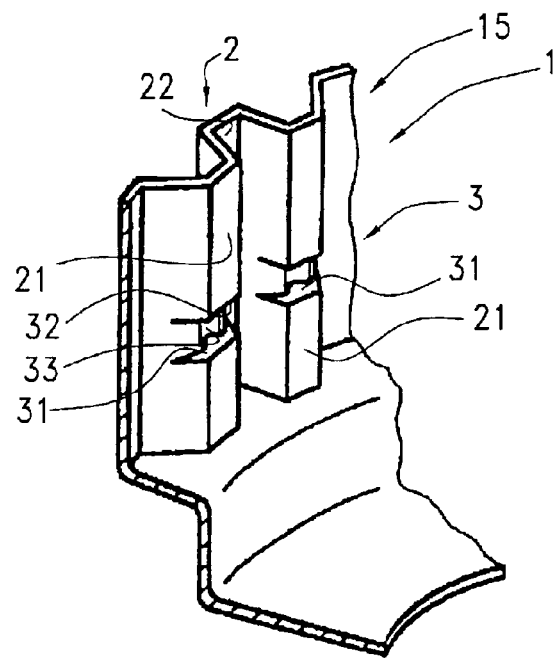
FIG. 9 is a partially cut-away perspective view showing a configuration of a clutch drum in accordance with a third embodiment of the present invention.

In this third embodiment, the position of the snap ring groove 3 of the clutch drum 1 is changed from that in Embodiment 1. Specifically, as shown in FIG. 9, the snap ring groove 3 is formed in approximately the middle of the axial length of spline teeth 2.

In this third embodiment also the presence of the snap ring groove 3 considerably increases rigidity over that afforded by the conventional groove structure.

In other respects, Embodiment 3 achieves substantially the same advantages as those of Embodiment 1.

Fourth Embodiment

Figure 10:
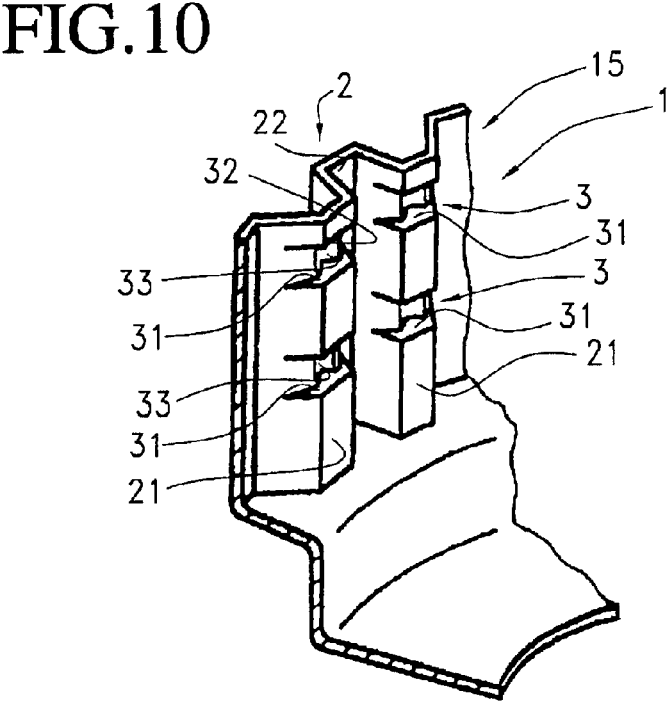
FIG. 10 is a partially cut-away perspective view showing a configuration of a clutch drum in accordance with a fourth embodiment of the present invention.

This fourth embodiment is a combination of Embodiment 1 and Embodiment 3 as shown in FIG. 10. That is, in Embodiment 4, two snap ring grooves 3 are formed, respectively, at a position near the opening, and at a position substantially in the middle of the axial length of the splines.

The presence of the two snap ring grooves 3 further increases the rigidity of the spline teeth 2.

In other respects, Embodiment 4 achieves substantially the same advantages as those of Embodiment 1.

Figure 11:
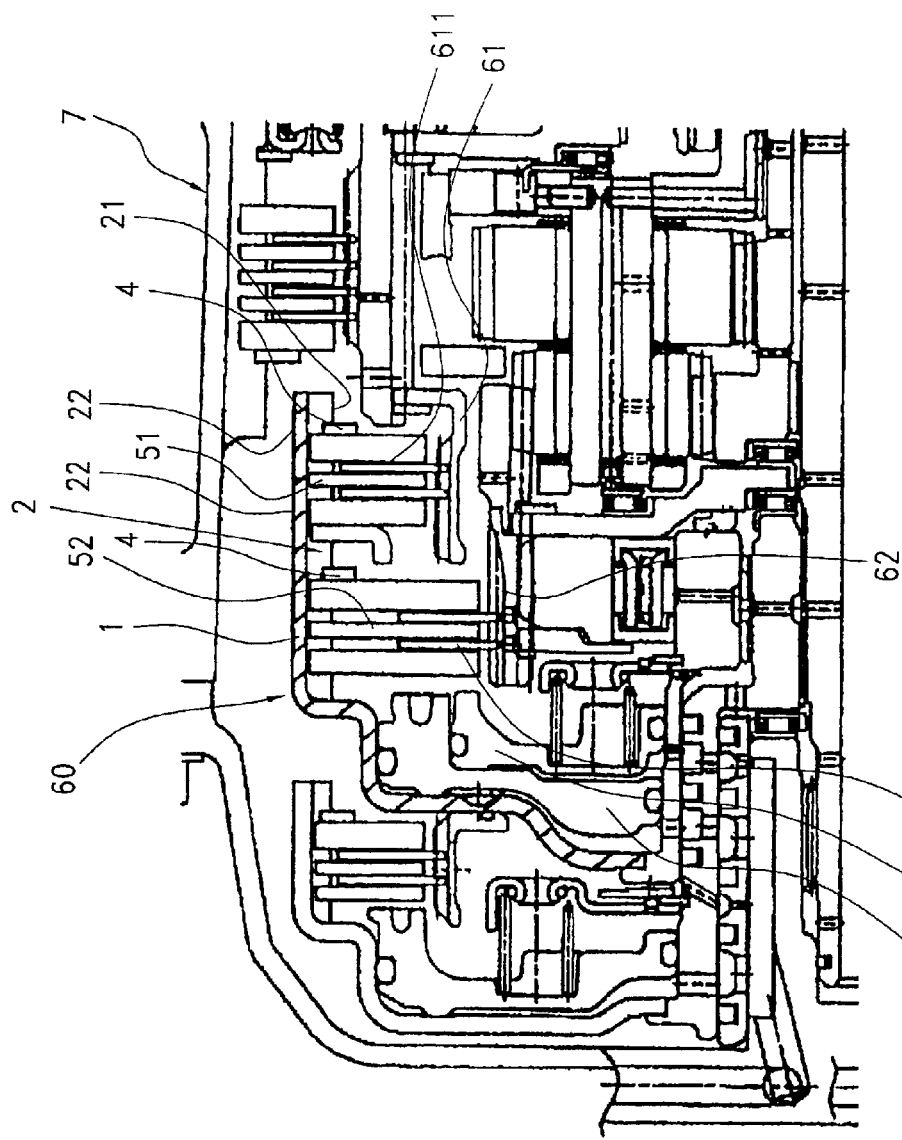
FIG. 11 is a partially cut-away sectional view showing an automatic transmission incorporating a clutch drum in accordance with the present invention.

FIG. 11 shows an automatic transmission 7 incorporating the clutch drum 1 of the fourth embodiment. The automatic transmission 7 is shown in FIG. 11 as having a plurality of gear sets and a clutch 60 for transferring rotation from an input shaft to an output shaft.

The clutch 60 is made up of a clutch drum 1 that has friction plates 51, 52, and clutch hubs 61, 62 that have friction plates 611, 621. In the clutch drum 1, the friction plates 51, 52 are disposed radially inward of the clutch drum 1 in such a manner that outer teeth formed on the outer peripheral edge of each of the friction plates 51, 52 are meshed with spline teeth 2 formed on the inner surface of the cylindrical wall of the clutch drum 1.

The friction plates 611, 621 are disposed radially outward of the clutch hubs 61, 62 with inner teeth formed on inner edges of the friction plates 611, 621 meshed with spline teeth formed on the outer surface of the cylindrical walls of the clutch hubs 61, 62, respectively.

Friction plates 51, 611 are brought into engagement by a clutch piston 612 which presses the friction plates together. Likewise, friction plates 52, 621 are engaged by a clutch piston 622 pressing these friction plates together. The clutch 60 is designed so as to transfer rotation from the input shaft to the various gear sets.

As best seen in FIG. 10 the clutch drum 1 has spline teeth 2 on the inner surface of cylindrical wall portion 15. Spline teeth 2 are formed of alternately arranged ridge portions 21, which protrude radially inwardly, and trough portions 22 formed between the ridge portions 21. Each ridge portion 21 has two snap ring grooves 3 that extend in the circumferential direction. Each snap ring groove 3 is formed by two side walls 31, 32 that face each other and a bottom portion 33 bent outwardly and connecting the side walls. The two side walls 31, 32 are substantially parallel to each other. A junction between the side wall 31 and the bottom portion 33 is formed by half blanking.

The clutch drum 1 constructed as described above improves the reliability and safety of the automatic transmission 7 and reduces its weight and size.

Because the two side walls 31, 32 are substantially parallel, the width of each snap ring groove 3 can be relatively reduced, and the effective length of each spline ridge is sacrificed less than in the prior art designs.

Further, because the side walls 31, 32 of each snap ring groove 3 are substantially parallel, the snap ring 4 in each snap ring groove 3 is retained facing the side walls 31, 32. Therefore, the snap ring 4 in each snap ring groove 3 is prevented from shifting, tilting or breaking when the clutch piston presses the friction plates together. The reaction force to the piston pressing force is received by each snap ring 4.

Further, because the junction between the side wall 31 and the bottom portion 33 of each snap ring groove 3 is formed by half blanking, the rigidity of the spline teeth 2 is considerably improved by the presence of the snap ring grooves 3 and the spline teeth 2 will not deform outwardly when subjected to centrifugal force.

Since the improved retainment of the snap rings 4 and the improved rigidity of clutch drum 1 reduce or prevent deformation in rotation, the reliability and stability of the automatic transmission 7 can be improved. Furthermore, the improved rigidity of the clutch drum 1 eliminates any need to increases weight, by increasing the wall thickness of the clutch drum 1 or otherwise. Thus, the clutch drum 1 can be reduced in weight and size, and therefore the automatic transmission 7 incorporating same can be reduced in weight and size.

Fifth Embodiment

Figure 12:
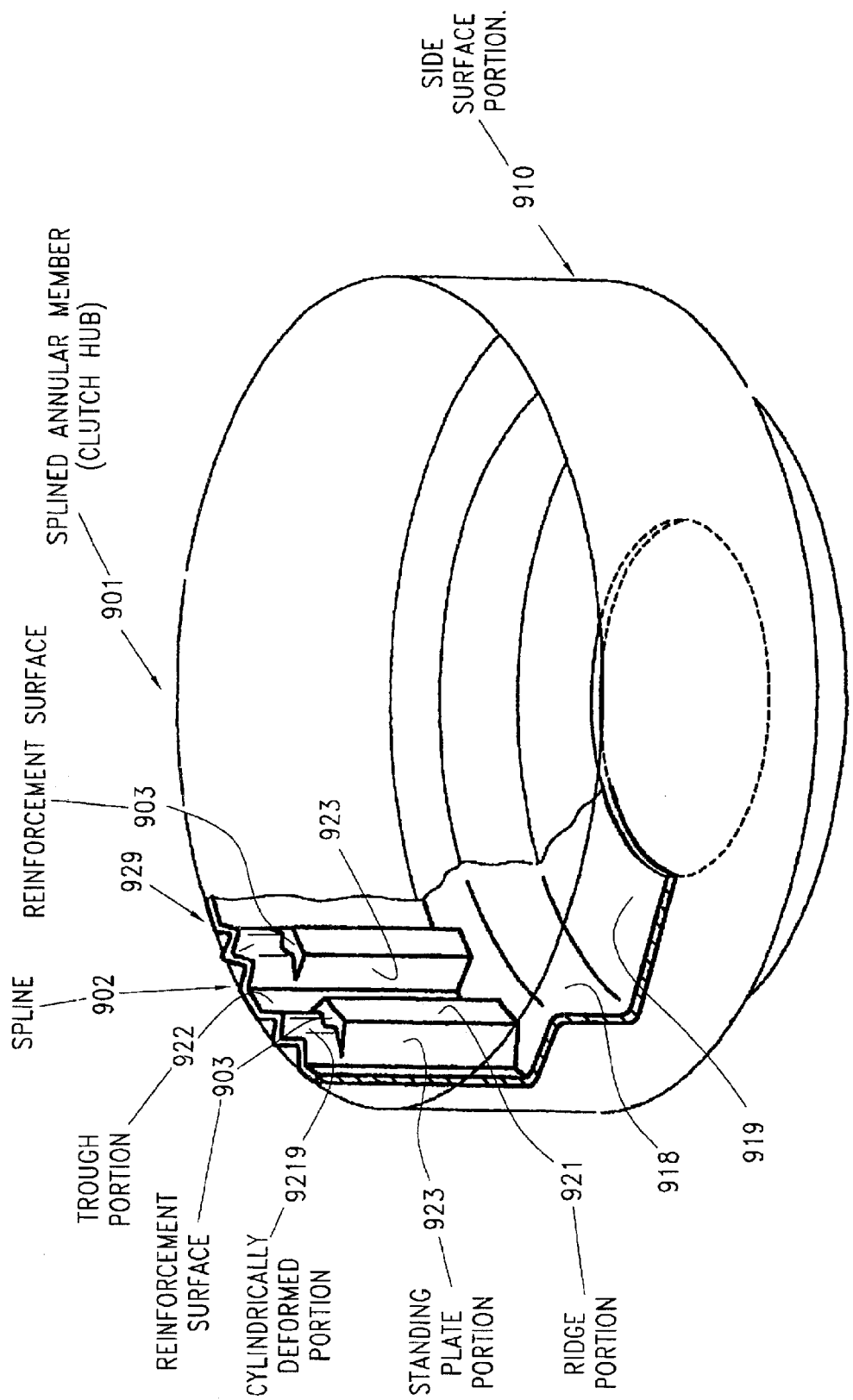
FIG. 12 is a partially cut-away perspective view showing a configuration of a clutch drum in accordance with a fifth embodiment of the present invention.

A splined annular member in accordance with a fifth embodiment will now be described with reference to FIGS. 12 to 14. As shown in FIG. 12, the annular member 1 in this embodiment has a side cylindrical surface 910 with spline teeth 902 formed of alternately arranged inwardly protruding ridges 921 and troughs 922 formed between the ridges 921.

Adjacent opening 929 each of the spline teeth 902 has a reinforcement surface 903 formed by outward deformation (half-blanking) of a portion of the ridge 921 to form an indented portion 9219.

The annular member 901 of this fifth embodiment is intended to serve as a clutch hub in an automatic transmission. As shown in FIG. 12, the clutch hub 901 has a circular disc-shaped bottom plate portion 919 having a central opening, an inner cylindrical portion 918 which extends from the bottom plate portion 919 and is generally circular in section, and an outer cylindrical side wall 910 having the spline teeth 902. The spline teeth 902 have a trapezoidal shape formed of ridges 921, and troughs 922, and standing plate portions 923 provided between the ridges 921 and the troughs 922.

In production of the clutch hub 901, a steel plate is press-formed into a cylindrical shape and the spline teeth 2 are formed. Then, the reinforcement surfaces 903 and the indented deformed portion 9219 are formed by pressing.

Figure 13:
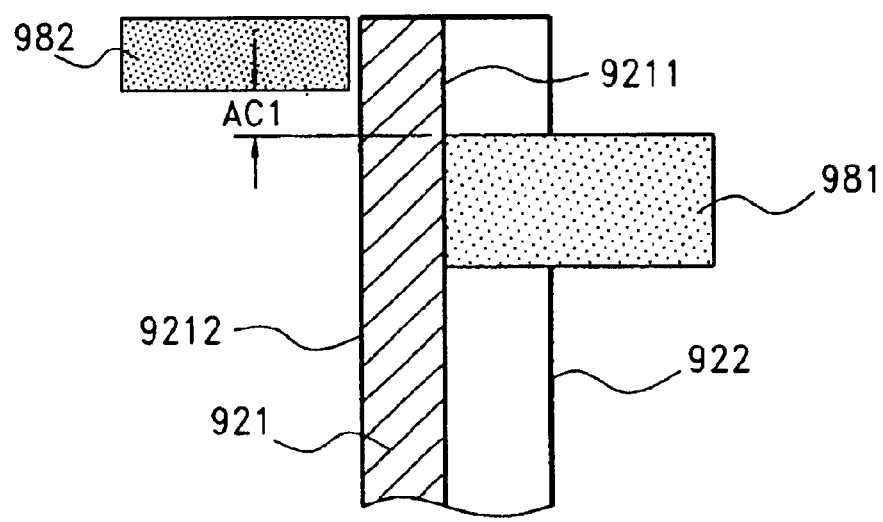
FIGS. 13 and 14 illustrate a process of forming the clutch drum of the fifth embodiment.

In this embodiment, the reinforcement surface 903 of each ridge portion 921 is formed as shown in FIG. 13 by using a die 981 that contacts an outer surface 9211 of the ridge 921, and a punch 982 that contacts an inner surface 9212 of the ridge portion 921. In this embodiment, the clearance AC1 between the die 981 and the punch 982 is set to a size that is sufficiently greater than the clearance for cutting and is less than the thickness of the ridge portions 921 so as to allow half-blanking.

Figure 14:
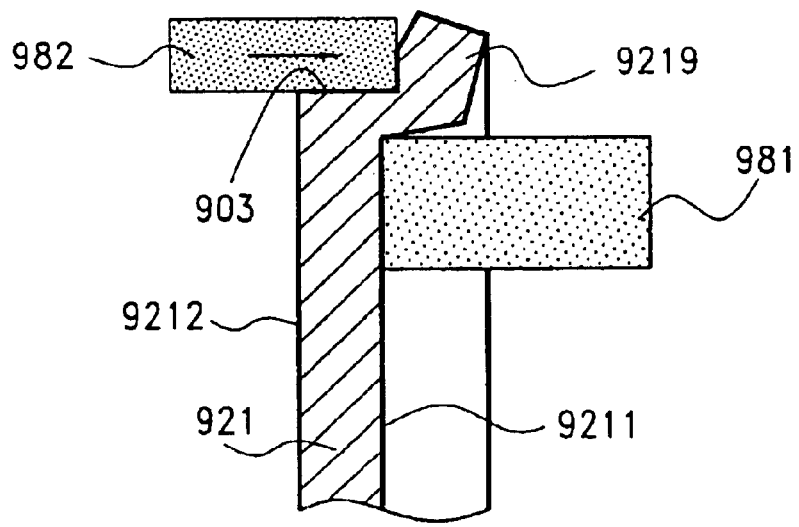

By advancing the punch 982 as shown in FIG. 14, half-blanking is performed so as to form the reinforcement surface 903 extending transversely from the inner side to the outer side of the ridge 921. The reinforcement surface 903 is not cut but remains connected to the ridge portion 921, the standing plate portions 923 on both sides, and the indented (deformed) portion 9219, which is that portion of the ridge 921 pressed by the punch 982 as shown in FIG. 12.

By performing the above-described deforming (half-blanking) process on all the ridges 921, the reinforcement surfaces 903 and the indented portions 9219 are formed in a circumferential arrangement at the open end 929. Therefore, the indented portions 9219 and the troughs 922 together form a generally cylindrical shape (cylindrical portion).

Since the clutch hub 901 produced as described above has the reinforcement surfaces 903 in the ridge portions 921 of the spline teeth 902, it does not deform when rotated.

With the reinforcement surface 903 of each ridge 921 formed by half blanking as described above, the ridge 921, the indented portion 9219 and the standing plate portions 923 between the ridges 921 and the troughs 922 are connected by the half-blanked portion. Therefore, when subjected to centrifugal force or the like, the interval between the two standing plate portions 923 is maintained by the reinforcement surface 903, so that the reinforcement surface 903 receives stress in response to a radially expansive centrifugal force, and therefore displacement thereof is prevented or reduced. That is, the rigidity of the spline teeth 902 is considerably improved due to the presence of the reinforcement surfaces 903 and indented portions 9219. Hence, when the clutch hub 901 is rotated, deformation of the spline teeth 2 by outward expansion due to centrifugal force is prevented.

Because of the serial, circumferential arrangement of the indented portions 9219 and the troughs 922 when the entire cylindrical portion at the open end receives stress due to centrifugal force, concentration of stress at a local position and localized deformation are substantially prevented. That is, the rigidity of the spline teeth 902 is considerably improved due to the presence of the indented portions 9219. In other words, the rigidity of that portion of the clutch hub 901 near the opening 915, which is most likely to deform when the clutch hub 1 rotates, can be efficiently increased.

Therefore, there is no need to, for example, increase the wall thickness of the spline teeth 902, which would result in an increased weight and it becomes possible to provide a light-weight, compact-size and high-rigidity clutch hub 901 having spline teeth 902.

Sixth Embodiment

Figure 15:
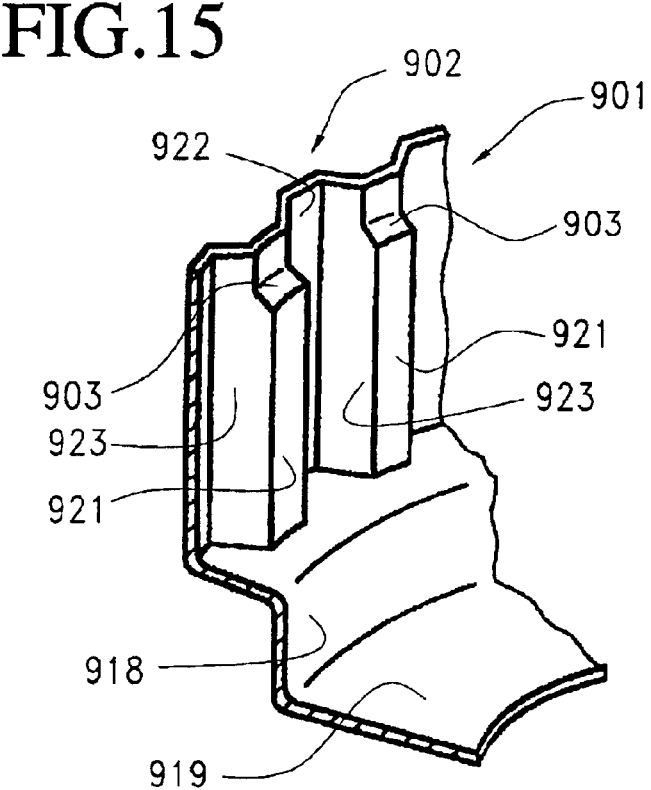
FIG. 15 is a partially cut-away perspective view showing a configuration of a clutch drum in accordance with a sixth embodiment of the present invention.
Figure 16:
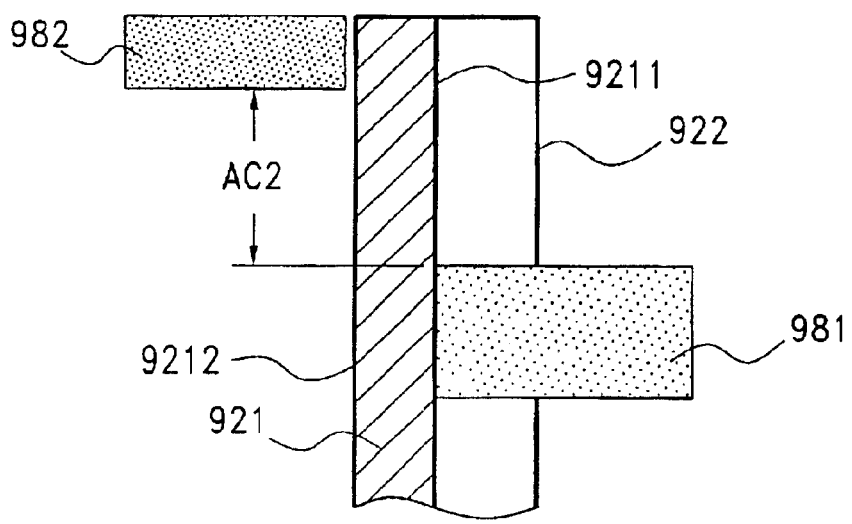
FIGS. 16 and 17 illustrate a process of forming a a ring groove of the sixth embodiment.
Figure 17:
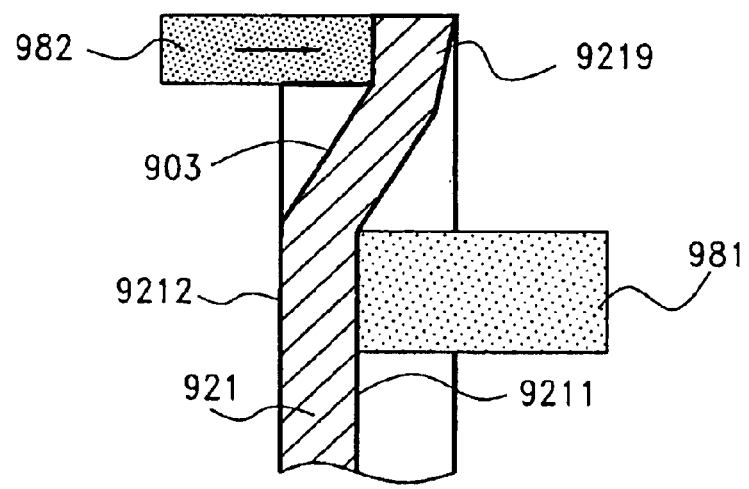

FIGS. 15 to 17 show an annular member (clutch hub) 901 which has reinforcement surfaces 903 and indented portions 9219 that are formed by a buckling process instead of the half blanking process as in the above-described embodiments.

The reinforcement surface 903 and the indented portion 9219 of each ridge 921 of the clutch hub 901 of this embodiment are formed as in Embodiment 5, by using a die 981 that contacts an outer surface 9211 of the ridge 921, and a punch 982 that contacts an inner surface 9212 of the ridge 921, as shown in FIG. 16. However, in this embodiment, the clearance between the die 981 and the punch 982 is different from that of the fifth embodiment. More specifically, as shown in FIG. 16, the clearance AC2 between the punch 982 and the die 981 is less than the thickness of the ridge portion 921 and is sufficiently greater than the clearance set for a half blanking process. Therefore, when the punch 982 is advanced as shown in FIG. 17, a buckling results due to the size of the clearance AC2. Hence, in this embodiment, the reinforcement surface 903 is formed expanding gradually outward in an oblique fashion, instead of at a right angle to the axis of the clutch hub 901. The indented portion 9219 is formed as it is pressed outward during the buckling process.

In this embodiment also, the reinforcement surface 903 and the indented portion 9219 are not cut, but remain connected to the ridge 921, i.e. the standing plate portions 923 on both sides. The indented portion 9219 is a deformed portion of the ridge depressed or squeezed by the punch 982. Therefore, the presence of the reinforcement surfaces 903 and the indented portions 9219 improves the rigidity of the clutch hub 901, and reduces the weight and size thereof, as in the fifth Embodiment.

Furthermore, since a buckling process is employed, the reinforcement surfaces 903 and the indented portions 9219 can be formed without any shearing, so that the rigidity of the clutch hub 901 can be further improved.

Seventh Embodiment

This embodiment is a modification of the third embodiment.

Figure 19:
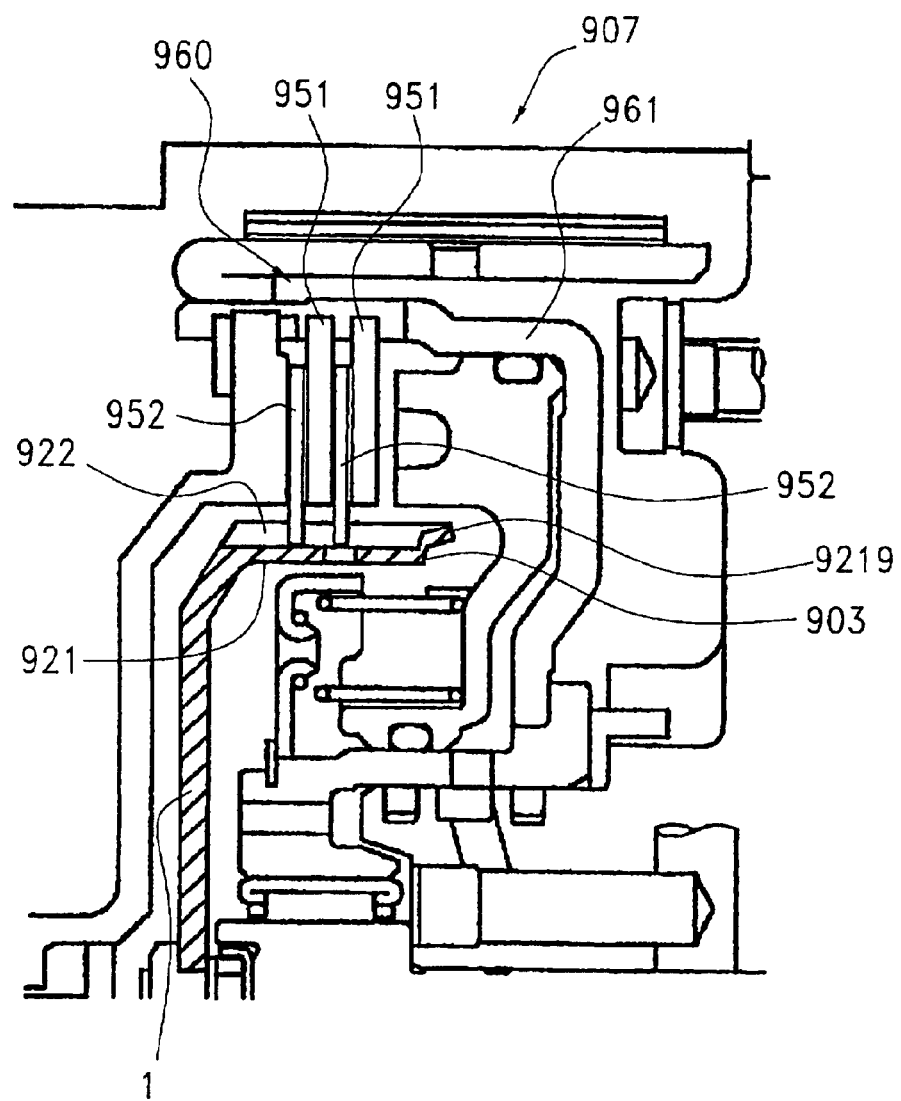
FIG. 19 is a partially cut-away sectional view showing a portion of an automatic transmission incorporating a clutch drum in accordance with the present invention.

FIG. 19 shows an automatic transmission 907 for a motor vehicle as having a plurality of gear sets for transferring rotation from an input shaft (not shown) to an output shaft (not shown), and a clutch 960 in which a friction plate 951 is disposed radially inwardly of a clutch drum 961 in such a manner that outer teeth formed on the friction plate 951 are meshed with spline teeth 2 formed on the inner cylindrical surface of the clutch drum 961. A friction plate 952 is disposed radially outward of the clutch hub 901 in such a manner that inner teeth formed on the friction plate 952 are meshed with spline teeth 902 formed on the outer cylindrical surface of the clutch hub 901. By engagement between the friction plates 951, 952, the clutch 60 transfers rotation from the input shaft to the plurality of gear sets.

Figure 18:
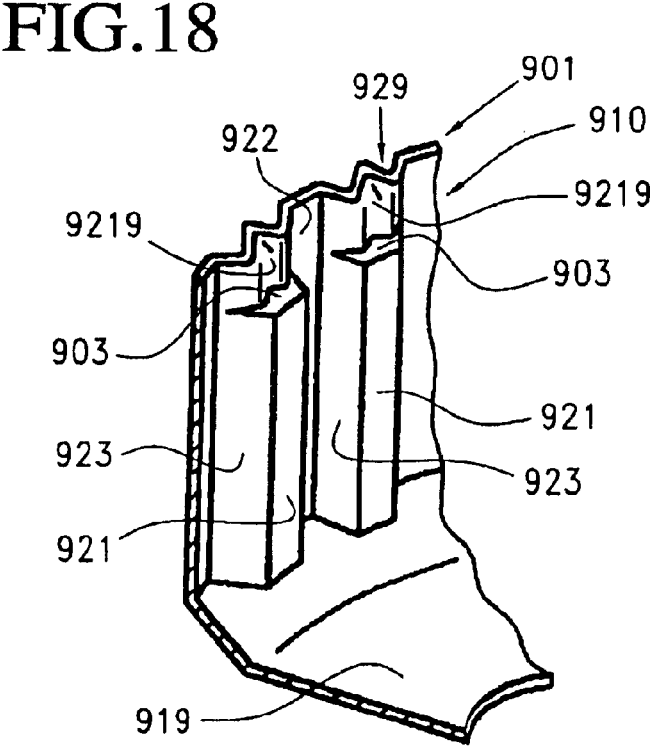
FIG. 18 is a partially cut-away perspective view showing a configuration of a clutch drum in accordance with a seventh embodiment of the present invention.

As shown in FIG. 18, the clutch hub 901 of this seventh embodiment has a cylindrical side wall 910 with spline teeth 902 formed of alternately arranged ridges 921, which protrude inwardly, and troughs 922 between the ridges 921. An end portion 929 of each of the spline teeth 902 adjacent the hub opening has an indented portion 9219 and a reinforcement surface 921, both formed by deformation of a ridge 921. Each reinforcement surface 903 is formed by half blanking as in the fifth embodiment. The reinforcement surface 903 extends outwardly from the inner surface of ridge 921 and is not cut but remains connected to the ridge portion 921, i.e. to the standing plate portions 923 on both sides and to the indented portion 9219 formed by pressing with the punch 982 (FIG. 14). As in the previously described embodiments, the presence of the reinforcement surfaces 903 and the indented portions 9219 improves the rigidity of the clutch hub 901, and reduces the weight and size thereof.

By incorporation of the clutch hub 901 described above, the reliability and stability of the automatic transmission 7 can be improved, and the overall weight and size of the entire automatic transmission 7 can be reduced.

The splined annular member of the invention may also be in the form of a clutch drum. Like a clutch hub as previously described, the clutch drum can be reduced in size and weight.

Further, provision of the radially outward deformed (indented) portion 9219 at the opening 929 of the clutch hub 901 makes it easy to assemble the members that form a clutch, including a clutch drum, a piston, a plate and a clutch hub as a unit, and therefore makes it possible to reduce the man-hours required for assembly of the automatic transmission.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations are also within the spirit and scope of the invention.

What is claimed is:

1. A splined annular member comprising:
a corrugated cylindrical side wall having internal ridges serving as splines, which protrude inwardly to interior apexes and alternate with troughs formed between the internal ridges, and further having external ridges corresponding to the throughs formed between the internal ridges, and further having external ridges corresponding to the throughs and protruding outwardly to exterior apexes; and
a circumferentially extending groove formed in each internal ridge,
wherein said groove is defined by two side walls that face each other and by a bottom portion extending between the side walls and located radially outward of the interior apexes and radially inward of the exterior apexes, said side walls being substantially parallel to each other, and wherein at least one junction connects the bottom portion with one of said side walls and is formed by half blanking.

2. The splined annular member according to claim 1, wherein junctions are formed between both of the side walls and the bottom portion by half blanking.

3. The splined annular member according to claim 1, wherein the bottom portion is cut away from one of said side walls.

4. The splined annular member according to claim 1, wherein the splined annular member is a clutch drum for an automatic transmission, and the groove is a snap ring groove into which a snap ring is inserted.

5. The splined annular member according to claim 4, wherein the clutch drum has a snap ring groove formed in said splines adjacent an opening at one axial end.

6. The splined annular member according to claim 4, wherein the clutch drum has a snap ring groove in substantially the middle of the axial length of said splines.

7. The splined annular member according to claim 4, wherein the clutch drum has a first snap ring groove formed in said splines near an opening at one end of said cylindrical side wall, and a second snap ring groove formed in substantially the middle of the axial length of said splines.

8. An automatic transmission comprising:
a clutch including a clutch drum, a clutch hub, at least one friction plate splined to an inner surface of said clutch drum, and at least one friction plate splined to an outer surface of said clutch hub,
wherein said clutch drum has a corrugated cylindrical wall having splines formed as internal ridges which protrude inwardly to interior apexes, and alternate with troughs formed between the internal ridges, and further having external ridges corresponding to the troughs and protruding outwardly to exterior apexes;
wherein a snap ring groove extends circumferentially through each ridge; and
wherein the snap ring groove is defined by two parallel side walls that face each other and a bottom portion extending between the side walls and located radially outward of the interior apexes and radially inward of the exterior apexes, and at least one junction connects the bottom portion with a side wall.

9. The automatic transmission according to claim 8, wherein junctions are formed between both of the side walls and the bottom portion by half blanking.

10. The automatic transmission according to claim 8, wherein the bottom portion is cut away from one of the side walls of the snap ring groove.

11. The automatic transmission according to claim 8, wherein the a snap ring groove is formed in said splines adjacent an opening at one axial end.

12. The splined annular member according to claim 8, wherein the snap ring groove is formed in substantially the middle of the axial length of said splines.

13. The splined annular member according to claim 8, wherein the clutch drum has a first snap ring groove formed in said splines near an opening at one end of said cylindrical side wall, and a second snap ring groove formed in substantially the middle of the axial length of said splines.

14. A splined annular member comprising:
a corrugated cylindrical side wall having internal ridges serving as splines which protrude inwardly to interior apexes and alternate with troughs formed between the internal ridges, and further having external ridges corresponding to the troughs and protruding outwardly to exterior apexes, each of the splines having a recess with a bottom wall radially outward of the interior apex of the spline and traversing the width of the spline; and
a reinforcing surface formed in an end portion of each spline, traversing the width of the spline and extending radially outward from an internal apex to the bottom wall of the recess, the reinforcing surface being located adjacent an open axial end of the annular member and formed by deformation of a portion of the spline radially outward.

15. The splined annular member according to claim 14, wherein the reinforcing surface is formed by half-blanking the splined portion.

16. The splined annular member according to claim 14, wherein the reinforcing surface is formed by buckling the spline end portion.

17. The splined annular member according to claim 14, wherein the splined annular member is a clutch hub for an automatic transmission.

18. The splined annular member according to claim 14 wherein said reinforcing wall is substantially perpendicular to the interior apex.

19. The splined annular member according to claim 14 wherein the reinforcing wall extends obliquely from the interior apex to the bottom wall of the recess.

20. An automatic transmission comprising:

a clutch including a clutch drum, a clutch hub, at least one friction plate splined to an inner surface of said clutch drum, and at least one friction plate splined to an outer surface of said clutch hub, wherein said clutch hub has a corrugated cylindrical wall having splines formed as internal ridges which protrude radially inwardly to interior apexes and alternate with troughs formed between the internal ridges, and further having external ridges corresponding to the troughs and protruding outwardly to exterior apexes, and a reinforcing surface formed in an end portion of each spline, traversing the width of the spline and extending radially outward from an internal apex to the bottom wall of the recess, the reinforcing surface being located adjacent an open axial end of the clutch hub and formed by deformation of a portion of a spline radially outward.

21. The automatic transmission according to claim 20, wherein the reinforcing surface is formed by half-blanking the spline end portion.

22. The automatic transmission according to claim 20, wherein the reinforcing surface is formed by buckling the spline end portion.

23. The automatic transmission of claim 20 wherein the reinforcing surface is substantially perpendicular to the interior apex.

24. The automatic transmission according to claim 20 wherein the reinforcing surface extends from the interior apex to the bottom wall of the recess.

* * * * *